(12) United States Patent
Cordova Magana et al.

(10) Patent No.: US 12,025,434 B2
(45) Date of Patent: Jul. 2, 2024

(54) SYSTEM AND METHOD FOR MEASURING AN ANGLE IN A TURBOMACHINE

(71) Applicant: General Electric Company, Schenectady, NY (US)

(72) Inventors: Jose Antonio Cordova Magana, Queretaro (MX); Carlos Alberto Pena Guerrero, Queretaro (MX); Julisa Nallely Ramirez Chavez, Queretaro (MX)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 435 days.

(21) Appl. No.: 17/503,255

(22) Filed: Oct. 15, 2021

(65) Prior Publication Data
US 2023/0124944 A1    Apr. 20, 2023

(51) Int. Cl.
*G01B 5/24* (2006.01)

(52) U.S. Cl.
CPC ........................ *G01B 5/24* (2013.01)

(58) Field of Classification Search
CPC ......... G01B 5/24; G01B 5/0009; G01B 3/563
See application file for complete search history.

(56) References Cited

U.S. PATENT DOCUMENTS

| | | | | |
|---|---|---|---|---|
| 2,908,080 A * | 10/1959 | Varbel | ................ | B25H 7/04 |
| | | | | 33/423 |
| 5,154,003 A * | 10/1992 | Moore | ................ | G01B 7/12 |
| | | | | 33/798 |
| 5,327,907 A * | 7/1994 | Fischer | ................ | A61B 5/1075 |
| | | | | 600/587 |
| 5,629,479 A * | 5/1997 | Paulson | ................ | G01B 7/14 |
| | | | | 33/794 |
| 6,536,124 B1* | 3/2003 | Eskew | ................ | G01B 3/56 |
| | | | | 33/538 |
| 6,725,555 B1* | 4/2004 | Moore | ................ | E04F 21/00 |
| | | | | 33/465 |
| 6,766,583 B2* | 7/2004 | Economaki | ................ | G01B 3/56 |
| | | | | 33/534 |

(Continued)

FOREIGN PATENT DOCUMENTS

| | | |
|---|---|---|
| CN | 102667070 A | 9/2012 |
| CN | 206681802 U * | 11/2017 |

(Continued)

OTHER PUBLICATIONS

European extended search Report for EP Application No. 22197833.1 dated Feb. 10, 2023; 12 pgs.

*Primary Examiner* — Yaritza Guadalupe-McCall
(74) *Attorney, Agent, or Firm* — Fletcher Yoder, P.C.

(57) ABSTRACT

A tool includes a first body portion having opposite first and second recesses facing toward one another about a space, wherein the opposite first and second recesses are configured to contact opposite sides of a first component disposed in the space. The tool includes a second body portion configured to rotate relative to the first body portion, wherein the second body portion is configured to contact a reference surface relative to the first component. The tool further includes an angle meter configured to measure an angle of the first component based on an angular position of the second body portion relative to the first body portion.

24 Claims, 6 Drawing Sheets

(56) References Cited

U.S. PATENT DOCUMENTS

| | | | | |
|---|---|---|---|---|
| 7,178,252 | B1 | 2/2007 | Belgard | |
| 7,188,427 | B2 * | 3/2007 | Johnson | B43L 7/02 |
| | | | | 33/465 |
| 7,228,636 | B1 * | 6/2007 | Moore | G01B 3/566 |
| | | | | 33/417 |
| 7,681,325 | B2 * | 3/2010 | Sassatelli | F01D 25/285 |
| | | | | 33/819 |
| 8,857,070 | B2 | 10/2014 | Niederbremer | |
| 8,978,262 | B2 * | 3/2015 | Spanos | G01B 5/14 |
| | | | | 33/645 |
| 2002/0046471 | A1 * | 4/2002 | Skidmore | A61B 5/107 |
| | | | | 33/511 |
| 2007/0220766 | A1 * | 9/2007 | Cooke | E04F 21/0076 |
| | | | | 33/456 |
| 2013/0340267 | A1 * | 12/2013 | Carbajal | G01C 15/10 |
| | | | | 33/286 |
| 2014/0144034 | A1 * | 5/2014 | Spanos | F01D 25/285 |
| | | | | 33/645 |
| 2016/0245637 | A1 * | 8/2016 | Hyslop | G01B 5/14 |
| 2018/0094533 | A1 | 4/2018 | Gamm et al. | |
| 2023/0124944 | A1 * | 4/2023 | Cordova Magana | G01B 5/24 |
| | | | | 33/534 |

FOREIGN PATENT DOCUMENTS

| | | |
|---|---|---|
| CN | 206681802 U | 11/2017 |
| CN | 112461093 A | 3/2021 |
| EP | 4166899 A1 * | 4/2023 ............. G01B 3/563 |
| WO | 2016162139 A1 | 10/2016 |

* cited by examiner

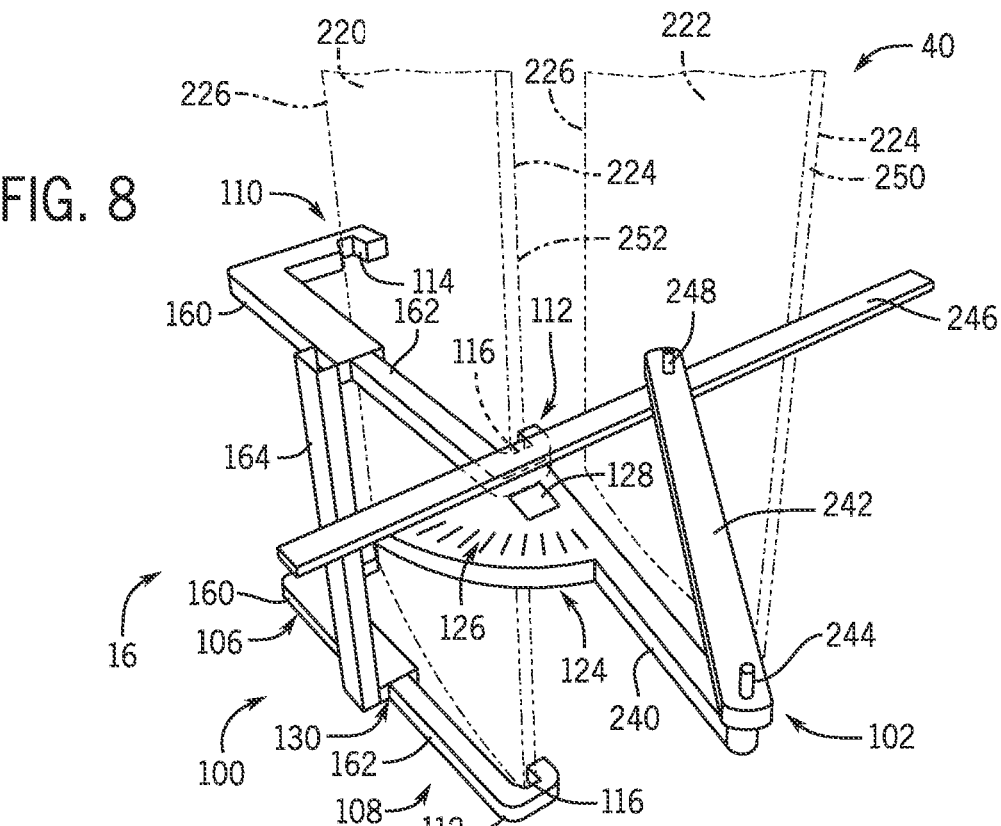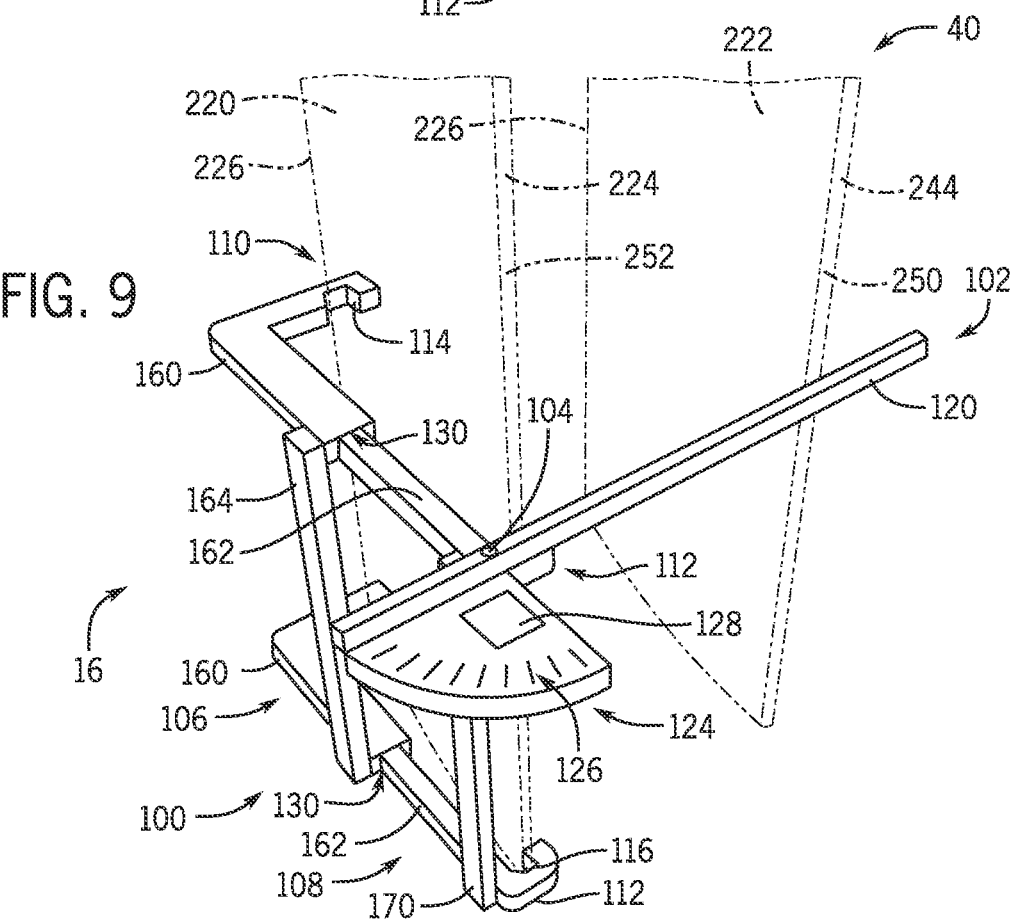

SYSTEM AND METHOD FOR MEASURING AN ANGLE IN A TURBOMACHINE

BACKGROUND

The present application relates generally to a system and method for measuring an angle, such as an angle of a blade or vane, in a turbomachine.

A turbomachine, such as a compressor or turbine, may include a plurality of vanes or blades arranged circumferentially about a rotational axis. In certain situations, it may be desirable to obtain angle measurements of one or more of the vanes or blades, such as during manufacturing, testing, servicing, and/or calibration. For example, a gas turbine engine may include a plurality of inlet guide vanes (IGVs) within an inlet plenum of a compressor. A control system may be configured to change the angle of the IGVs, thereby changing the flow of intake air into the compressor during operation of the gas turbine engine. The control system is generally calibrated to ensure that the actual angle of the IGVs matches the expected angle as controlled by the control system. Accordingly, the angle of IGVs may be measured using a protractor. Unfortunately, a technician has limited space to perform the measurement in the bell mouth of the compressor where the IGVs reside. The technician may have difficulty holding the protractor against the IGVs while simultaneously adjusting, tightening, and/or reading the protractor. Additionally, the protractor may provide inaccurate measurements due to incorrect placement of the protractor (e.g., backwards placement, lack of contact with surfaces of the IGVs, etc.).

For at least these reasons, a need exists for an improved tool to measure the angle of the IGVs, as well as other vanes and blades.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a tool includes a first body portion having opposite first and second recesses facing toward one another about a space, wherein the opposite first and second recesses are configured to contact opposite sides of a first component disposed in the space. The tool includes a second body portion configured to rotate relative to the first body portion, wherein the second body portion is configured to contact a reference surface relative to the first component. The tool further includes an angle meter configured to measure an angle of the first component based on an angular position of the second body portion relative to the first body portion.

In certain embodiments, a tool includes a first body portion having opposite first and second recesses facing toward one another about a space, wherein the first body portion includes first and second arm portions configured to move relative to one another to adjust a distance between the first and second recesses. The tool further includes a second body portion configured to rotate relative to the first body portion. The tool further includes an angle meter configured to measure an angle based on an angular position of the second body portion relative to the first body portion.

In certain embodiments, a method includes positioning a first body portion having opposite first and second recesses facing toward one another about a space, such that the opposite first and second recesses contact opposite sides of a first component disposed in the space. The method further includes rotating a second body portion relative to the first body portion to contact a reference surface relative to the first component. The method further includes measuring, via an angle meter, an angle of the first component based on an angular position of the second body portion relative to the first body portion.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein:

FIG. 8 is a perspective view of an embodiment of the angular measurement tool coupled to blades or vanes;

FIG. 9 is a perspective view of an embodiment of the angular measurement tool coupled to blades or vanes;

DETAILED DESCRIPTION

Figure 1:
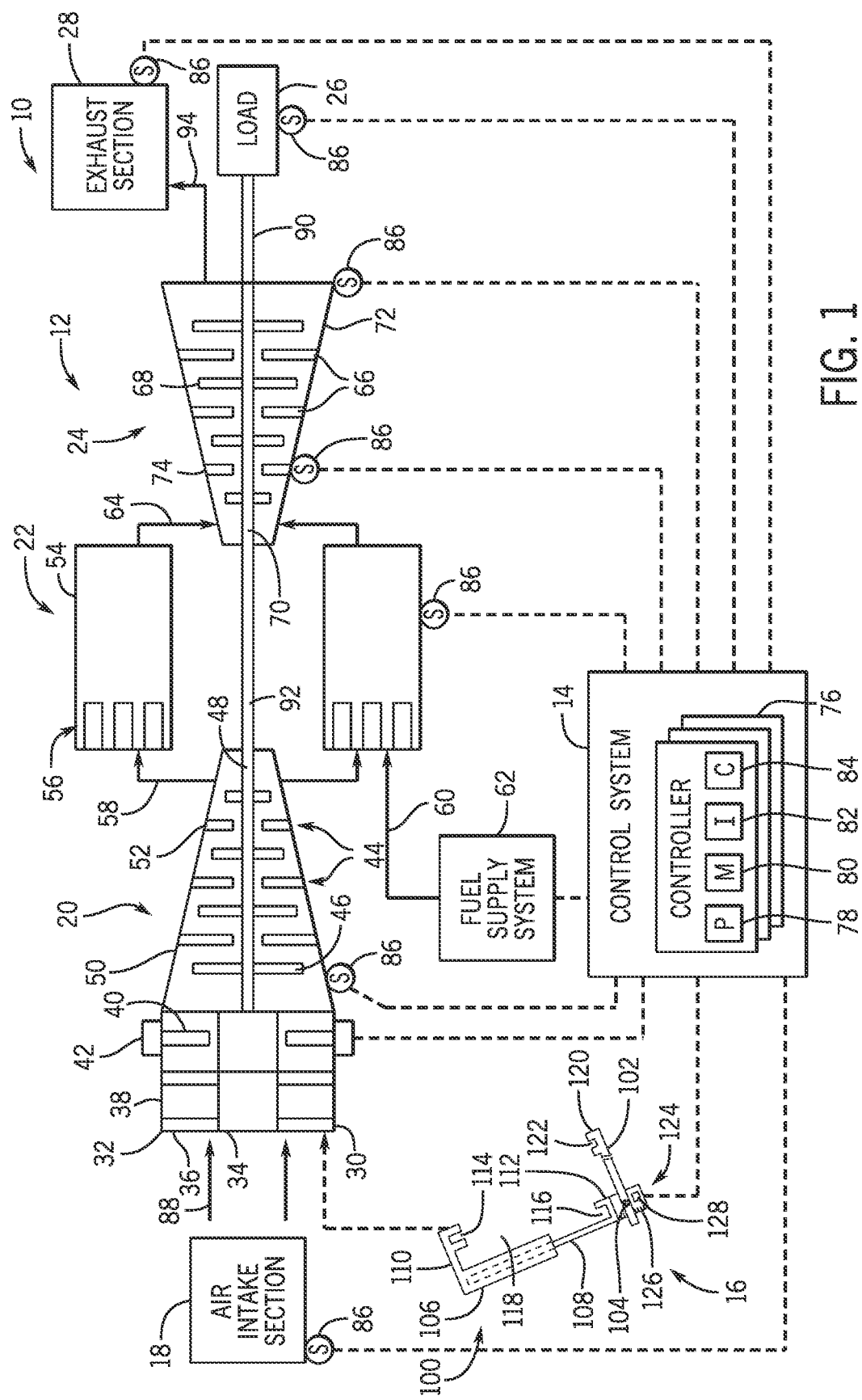
FIG. 1 is a schematic of an embodiment of a gas turbine system having an angular measurement tool for measuring an angle of adjacent blades or vanes.

One or more specific embodiments of the presently disclosed systems are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an,"

"the," and "said" are intended to mean that there are one or more of the elements. The terms "comprising," "including," and "having" are intended to be inclusive and mean that there may be additional elements other than the listed elements.

As discussed in detail below, various embodiments of an angular measurement tool are configured to simplify user measurements of angles of blades or vanes. The angular measurement tool is configured to ensure proper contact with the blades or vanes via spring-loaded arms, which may compressively fit the angular measurement tool about the blades or vanes during an angular measurement. The spring-loaded arms, hook portions on the spring-loaded arms, and other features discussed below may enable a technician to obtain angular measurements using only one hand, which is particularly advantageous in tight spaces. Additionally, the spring-loaded arms, hook portions on the spring-loaded arms, and other features discussed below may enable attachment of the angular measurement tool to the blades or vanes without any placement of a user's hands in a plane of the blades or vanes (e.g., IGVs), thereby improving safety when a user obtains angular measurements of the blades or vanes. The angular measurement tool may display the angular measurements in situ at the angular measurement tool via physical indicia on a surface, an electronic display, or another local indicator. Additionally, the angular measurement tool may use sensors (e.g., angular sensors, position sensors, and/or potentiometers) to obtain sensor data indicative of an angular position of the blades or vanes, wherein the sensor data may be stored in memory and/or communicated to a remote workstation (e.g., computer and/or electronic display) for display to a remote operator. Accordingly, the angular measurement tool may include communication circuitry (e.g., wired and/or wireless communication circuitry) to enable the communications. Although the angular measurement tool is illustrated and described for use with blades or vanes (e.g., a pair of adjacent IGVs), the angular measurement tool may be used to measure an angle of any desired machine components and any number of adjacent components (e.g., 2, 3, 4, 5, or more blades or vanes, such as IGVs).

FIG. 1 is a block diagram of an embodiment of a gas turbine system 10 having a gas turbine engine 12 coupled to a control system 14. As discussed in further detail below, the gas turbine system 10 may use an angular measurement tool 16 to measure an angle between adjacent blades or vanes in one or more sections of the gas turbine engine 12. The angular measurement tool 16 also may be used to measure an angle of other stationary or movable components within: the gas turbine system 10, equipment in a power plant, a pump, a compressor, a turbine (e.g., steam turbine, hydro turbine, wind turbine, etc.), an engine, industrial automation equipment, vehicles, or any other suitable application. The various features of the angular measurement tool 16 are discussed below with reference to FIGS. 1-11, and the various features may be used in any suitable combination with one another. However, before moving on to the angular measurement tool 16, the gas turbine system 10 will be described as one possible context for use of the angular measurement tool 16.

The gas turbine engine 12 includes an air intake section 18, a compressor section 20, a combustor section 22, a turbine section 24, a load 26, and an exhaust section 28. The air intake section 18 may include a duct having one or more silencer baffles, fluid injection systems (e.g., heated fluid injection for anti-icing), air filters, or any combination thereof. The compressor section 20 may include an upstream inlet duct 30 having a bell mouth 32, wherein the inlet duct 30 includes an inner hub 34, an outer wall 36 disposed circumferentially about the inner hub 34 to define an air intake flow path, a plurality of stationary vanes 38 extending radially between the inner hub 34 and the outer wall 36 within the air intake flow path, and a plurality of inlet guide vanes (IGVs) 40 arranged circumferentially about a central axis within the air intake flow path. The inlet guide vanes 40 also may be coupled to one or more actuators 42, which are communicatively coupled to and controlled by the control system 14. In operation, the control system 14 is configured to adjust the position (e.g., angular position) of the inlet guide vanes 40 to vary the flow of intake air into the compressor section 20 during operation of the gas turbine engine 12. The angular position of each inlet guide vane 40 may be relative to a central axis of the inlet duct 30 and/or the compressor section 20, a radial axis relative to the central axis, or an adjacent inlet guide vane 40.

The compressor section 20 includes one or more compressor stages 44, wherein each compressor stage 44 includes a plurality of compressor blades 46 coupled to a compressor shaft 48 within a compressor casing 50, and a plurality of compressor vanes 52 coupled to the compressor casing 50. The compressor blades 46 and the compressor vanes 52 are arranged circumferentially about a central axis of the compressor shaft 48 within each compressor stage 44. The compressor stages 44 may include between 1 and 20 or more compressor stages. Additionally, the compressor stages 44 alternative between sets of the compressor blades 46 and sets of the compressor vanes 52 in the direction of flow through the compressor section 20. In operation, the compressor stages 44 progressively compress the intake air before delivery to the combustor section 22.

The combustor section 22 includes one or more combustors 54 each having one or more fuel nozzles 56. In certain embodiments, the combustor section 22 may have a single annular combustor 54 extending around a central axis of the gas turbine engine 12. However, in some embodiments, the combustor section 22 may include 2, 3, 4, 5, 6, or more combustors 54 spaced circumferentially about the central axis of the gas turbine engine 12. The fuel nozzles 56 receive a compressed air 58 from the compressor section 20 and fuel 60 from a fuel supply system 62, mix the fuel and air, and ignite the mixture to create hot combustion gases 64, which then exit each combustor 54 and enter the turbine section 24.

The turbine section 24 includes one or more turbine stages 66, wherein each turbine stage 66 includes a plurality of turbine blades 68 arranged circumferentially about and coupled to a turbine shaft 70 inside of a turbine casing 72, and a plurality of turbine vanes 74 arranged circumferentially about the turbine shaft 70. The turbine stages 66 may include between 1 and 10 or more turbine stages. Additionally, the turbine stages 66 alternative between sets of the turbine blades 68 and sets of the turbine vanes 74 in the direction of flow through the turbine section 24. In operation, the hot combustion gases 64 progressively expand and drive rotation of the turbine blades 68 in the turbine stages 66.

The load 26 may include electrical generator, a machine, or some other driven load. The load 26 may be disposed at the hot end of the gas turbine engine 12 as illustrated in FIG. 1, or the load 26 may be disposed at the cold end of the gas turbine engine 12 (e.g., adjacent the compressor section 20). The exhaust section 28 may include an exhaust duct, exhaust treatment equipment, silencers, or any combination thereof. In some embodiments, the exhaust section 28 may include a heat exchanger, such as a heat recovery steam generator (HRSG) configured to generate steam to drive a steam turbine.

The control system 14 may include one or more controllers 76, each having a processor 78, memory 80, instructions 82 stored on the memory 80 and executable by the processor 78, and communications circuitry 84 configured to communicate with the angular measurement tool 16. The control system 14 is also coupled to various sensors (S) as indicated by element number 86 throughout the gas turbine system 10. For example, the sensors 86 may be coupled to and monitor conditions at the air intake section 18, the compressor section 20, the combustors 54 of the combustor section 22, the turbine section 24, the load 26, and the exhaust section 28. The control system 14 is configured to receive feedback from the sensors 86 to facilitate adjustments of various operating parameters of the gas turbine engine 12, such as the air intake flow, the fuel supply from the fuel supply system 62 to the combustors 54, operation of exhaust treatment equipment in the exhaust section 28, or any combination thereof. For example, the control system 14 may be configured to control the actuators 42 to change an angular position of the inlet guide vanes 40, thereby controlling the intake flow from the air intake section 18 into the compressor section 20. As discussed in further detail below, the angular measurement tool 16 is configured to measure an angle of the inlet guide vanes 40, thereby helping to ensure proper calibration and operation of the inlet guide vanes 40 and the actuators 42.

In operation, the gas turbine system 10 receives air into the inlet duct 30 from the air intake section 18 as indicated by arrows 88, the inlet guide vanes 40 are controlled by the actuators 42 to adjust an angular position of the inlet guide vanes 40 for adjusting air flow into the compressor section 20, and the compressor section is configured to compress the air flow being supplied into the combustor section 22. For example, each stage 44 of the compressor section 20 compresses the air flow with a plurality of the blades 46. The compressed air flow 58 then enters each of the combustors 54, where the fuel nozzles 56 mix the compressed air flow with fuel 60 from the fuel supply system 62. The mixture of fuel and air is then combusted in each combustor 54 to generate the hot combustion gases 64, which flow into the turbine section 24 to drive rotation of the turbine blades 68 in each of the stages 66. The rotation of the turbine blades 68 drives rotation of the turbine shaft 70, which in turn drives rotation of the load 26 and the compressor section 20 via a shaft 90 coupled to the load 26 and a shaft 92 coupled to the compressor shaft 48. The turbine section 24 then discharges an exhaust gas 94 into the exhaust section 28 for final treatment and discharge into the environment.

The angular measurement tool 16 is configured to measure an angular position of various vanes or blades throughout the gas turbine system 10, such as the inlet guide vanes 40, the compressor blades 46, the turbine blades 68, the compressor vanes 52, and/or the turbine vanes 74. For example, the angular measurement tool 16 may be used when calibrating or checking the position of the inlet guide vanes 40 relative to an expected position of the inlet guide vanes 40 (e.g., expected by the control system 14). The illustrated angular measurement tool 16 includes a body portion 100 rotatably coupled to a body portion 102 via a rotational joint 104. The body portion 100 may include arm portions 106 and 108 configured to contract and expand relative to one another, e.g., by moving the arm portions 106 and 108 axially relative to one another. The arm portions 106 and 108 may include respective hook portions 110 and 112 having respective recesses 114 and 116. The arm portions 106 and 108 are configured to contract and expand (e.g., move axially toward and away from one another) about a space 118 between the opposite hook portions 110 and 112, thereby enabling the hook portions 110 and 112 to capture and compressingly secure the body portion 100 about opposite sides of a vane or blade, such as a first one of the inlet guide vanes 40. The body portion 102 also includes an arm portion 120 having a respective recess 122, which is configured to contact a second one of the inlet guide vanes 40. The arm portion 120 is configured to rotate relative to the body portion 100 via the rotational joint 104. In the illustrated embodiment, the arm portion 120 is rotatably coupled to the arm portion 108 at the rotational joint 104.

Additionally, the angular measurement tool 16 includes an angle meter 124, which may be coupled to the body portion 100 at the arm portion 108. The angle meter 124 is configured to measure an angular position of the arm portion 120 of the body portion 102 relative to the arm portion 108 of the body portion 100. In operation, the angular position measured by the angle meter 124 is configured to indicate an angular position of two adjacent blades or vanes, such as adjacent inlet guide vanes 40. The angle meter 124 may include a plurality of angular indicia (e.g., angular position marks) on a surface of the arm portion 108 of the body portion 100, such that the arm portion 120 of the body portion 102 moves along the indicia 126 to indicate an angular position of the arm portion 120 and thus the blades or vanes (e.g., the inlet guide vanes 40). The angle meter 124 also may include an electronic meter unit 128, which may include a display, communication circuitry, a processor, memory, sensors to measure the angular position of the arm portion 120 relative to the arm portion 108, or any combination thereof. For example, the electronic meter unit 128 may sense a position of the arm portion 120, and display an angular position on an electronic display. Additionally, the electronic meter 128 may sense a position of the arm portion 120, and communicate data to the control system 14 indicating the angular position of the arm portion 120. Again, the angular position of the arm portion 120 relative to the arm portion 108 is indicative of the angular position of the adjacent blades or vanes, e.g., the adjacent inlet guide vanes 40.

As discussed in further detail below, the hook portions 110 and 112 having the respective recesses 114 and 116 may be configured to compressingly fit about leading and trailing edges of a blade or vane, such as the inlet guide vane 40, to secure the angular measurement tool 16 in place for an angular measurement. The arm portion 120 is configured to engage a reference surface relative to a first blade or vane (e.g., a first inlet guide vane 40) captured by the hook portions 110 and 112, such as a reference surface on a second adjacent blade or vane (e.g., an adjacent inlet guide vane 40). The reference surface may include a leading edge and/or a trailing edge of one or more blades or vanes (e.g., inlet guide vanes 40). For example, the recess 122 of the arm portion 120 may engage a leading edge of an adjacent inlet guide vane 40 as the reference surface. Once the hook portions 110 and 112 are compressingly fit about a first inlet guide vane 40 and the recess 122 is contacting a leading edge of an adjacent inlet guide vane 40, then the angle meter 124 may be used to determine an angular position of the two adjacent inlet guide vanes 40. For example, the angle meter 124 is configured to measure an angle of the first blade or vane (e.g., inlet guide vane) or both the first and second blades or vanes (e.g., inlet guide vanes) based on an angular position of the body portion 102 (e.g., arm portion 120) relative to the body portion 100 (e.g., arm portion 108).

Figure 2:
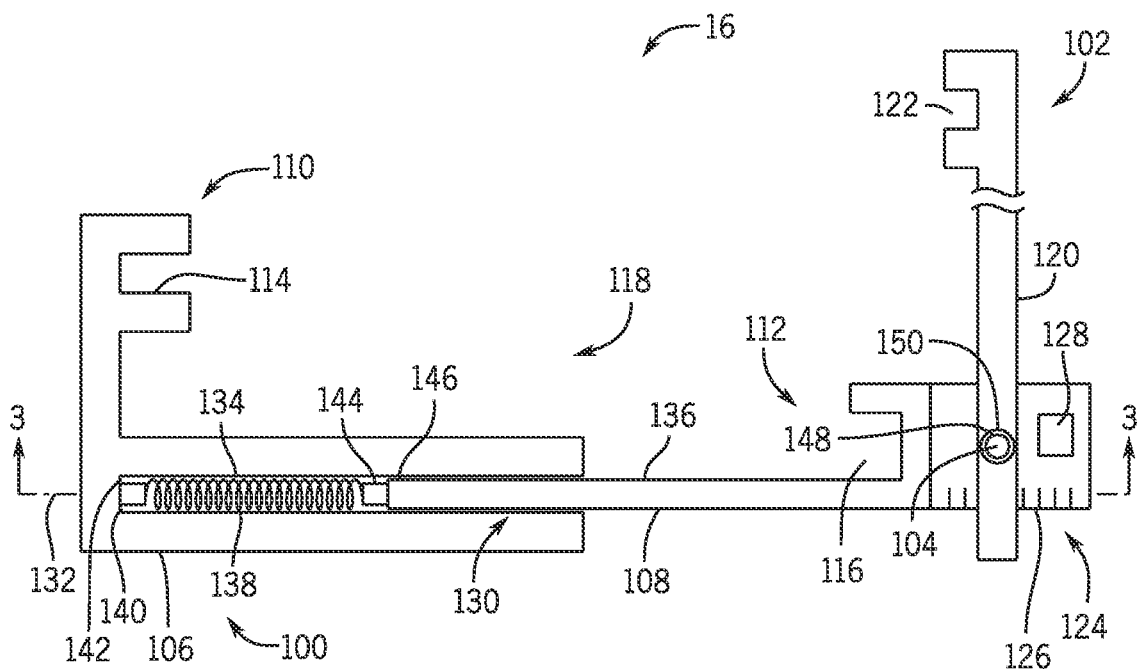
FIG. 2 is a top schematic view of an embodiment of the angular measurement tool of FIG. 1.

FIG. 2 is a top schematic view of an embodiment of the angular measurement tool 16 as illustrated in FIG. 1, further illustrating details of the connections between the arm portions 106 and 108 of the body portion 100 and the arm portions 108 and 120 of the body portions 100 and 102. As illustrated, the arm portions 106 and 108 of the body portion 100 are slidably coupled together to facilitate axial movement between the hook portions 110 and 112. In particular, the arm portions 106 and 108 have a telescopic or sliding axial connection 130, wherein the arm portions 106 and 108 are disposed one inside the other along an axial path as indicated by axis 132. As illustrated, the arm portion 106 includes an axial bore or channel 134, which slidingly receives an axial portion 136 of the arm portion 108. In an alternative embodiment, the arm portion 108 includes the axial bore or channel 134, which slidingly receives the axial portion 136 of the arm portion 106.

As illustrated, the axial portion 136 slides axially in and out of the axial bore or channel 134, and is biased via a spring 138. The illustrated spring 138 is coupled to a hook or fastener 140 at an end 142 of the axial bore or channel 134 and a hook or fastener 144 at an end 146 of the axial portion 136 of the arm portion 108. The spring 138 is in tension to pull the axial portion 136 of the arm portion 108 inwardly into the axial bore or channel 134, thereby moving the hook portions 110 and 112 of the respective arm portions 106 and 108 inwardly toward one another to facilitate engagement with leading and trailing edges of a blade or vane, such as the inlet guide vane 40 disposed in the space 118 between the recesses 114 and 116. In some embodiments, the spring 138 may be a mechanical spring, a fluid spring (e.g., a pneumatic or liquid driven spring, such as a piston biased by fluid pressure in a cylinder), magnets, or any combination thereof.

As also illustrated in FIG. 2, the arm portion 120 is configured to rotate about the arm portion 108 via the rotational joint 104. In certain embodiments, the rotational joint 104 includes a pin 148 and a resistance device 150. For example, the resistance device 150 may include an annular bushing or sleeve surrounding the pin 148, such that the bushing or sleeve may provide some friction to control movement of the arm portion 120 relative to the arm portion 108. In some embodiments, the resistance device 150 may include a torsion spring to bias the arm portion 120 in a direction toward the hook portion 110, such that the recess 122 may positively engage a reference surface of an adjacent inlet guide vane 40. The resistance device 150 also may include one or more coaxial annular sleeves with a plurality of incremental steps in a rotational direction, such that the rotation of the arm portion 120 occurs by clicking from one angular position to another during operation of the angular measurement tool 16. Additionally, the resistance device 150 may include an angular lock configured to lock an angular position at the rotational joint. As further discussed below, the illustrated body portion 100 may include one or more sets of the arm portion 106 and the arm portion 108.

Figure 3:
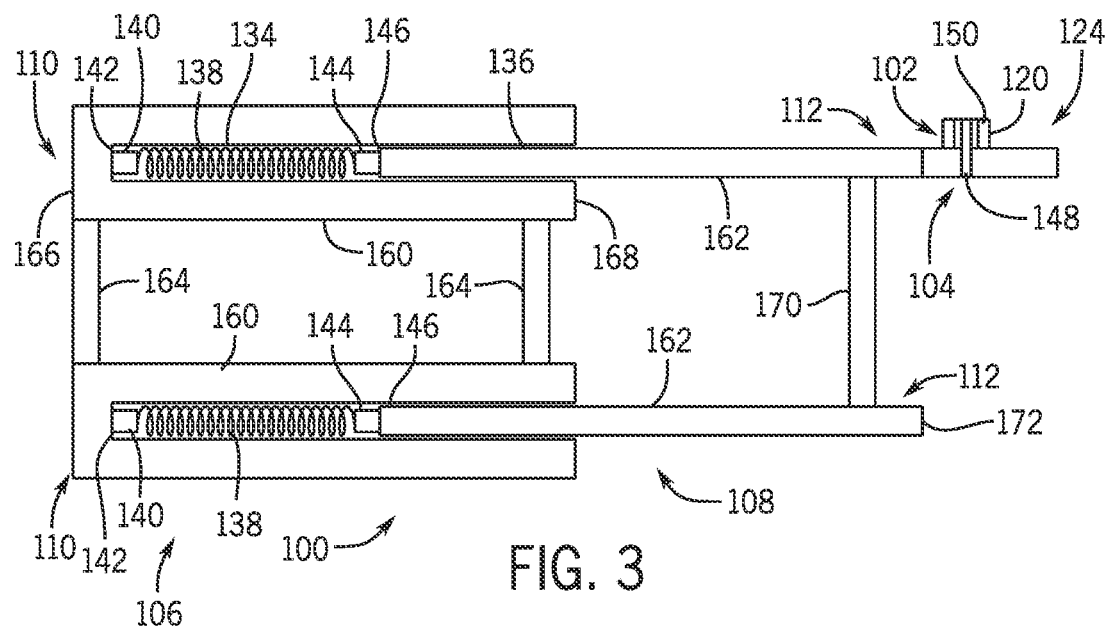
FIG. 3 is a side schematic view of an embodiment of the angular measurement tool taken along line 3-3 of FIG. 2, further illustrating details of arm portions of the angular measurement tool.

FIG. 3 is a schematic side view of the angular measurement tool 16 of FIG. 2, taken along line 3-3, further illustrating details of the body portion 100. In certain embodiments, the body portion 100 may include a plurality of parallel arms in the arm portions 106 and 108. For example, as illustrated in FIG. 3, the arm portion 106 includes a plurality of arms 160 and the arm portion 108 includes a plurality of arms 162. Although FIG. 3 illustrates two arms 160 and two corresponding arms 162, embodiments of the arm portions 106 and 108 may include 2, 3, 4, 5, 6, 7, 8, 9, 10, or more sets of arms 160 and 162. Additionally, the arms 160 of the arm portion 106 may be coupled together via one or more intermediate supports 164 extending crosswise (e.g., perpendicular) between the arms 160 at opposite end portions 166 and 168 of the arms 160. The intermediate supports 164 also may be disposed at one or more intermediate locations between the opposite end portions 166 and 168. The arm portion 108 also may include one or more intermediate supports 170 extending crosswise (e.g., perpendicular) between the arms 162. In the illustrated embodiment, the intermediate support 170 is disposed at an end portion 172 of the arms 162 adjacent the hook portions 112. In the illustrated embodiment, the intermediate supports 164 and 170 are parallel to one another.

As further illustrated in FIG. 3, each pair or arms 160 and 162 has the telescopic or sliding axial connection 130 as described in greater detail above with reference to FIG. 2. Accordingly, each arm 160 includes the axial bore or channel 134, while each arm 162 includes the axial portion 136. Again, the spring 138 is connected to hooks or fasteners 140 and 144, thereby spring biasing the arms 160 and 162 toward one another (e.g., spring biasing the axial portion 136 into the axial bore 134). In the illustrated embodiment, the arms 160 and the arms 162 are parallel to one another. In particular, the arms 160 are coupled together in a parallel relationship via the intermediate supports 164, the arms 162 are coupled together in a parallel relationship via the intermediate support 170, and arms 162 move together in the parallel relationship relative to the arms 160.

Figure 4:
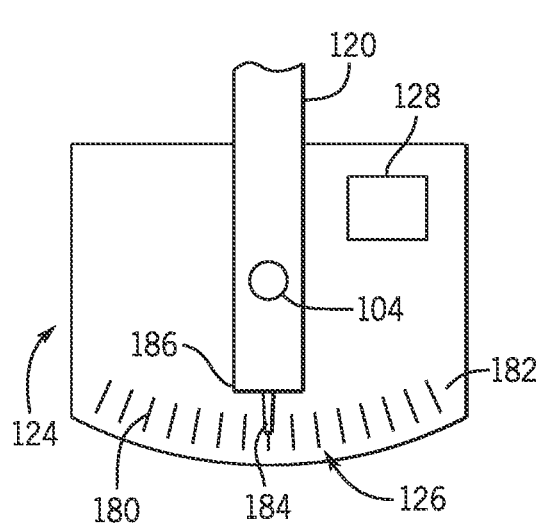
FIG. 4 is a schematic of an embodiment of visual indicia of an angle meter of the angular measurement tool of FIGS. 1-3.

FIG. 4 is a schematic view of an embodiment of the angle meter 124, illustrating details of the indicia 126. As illustrated, the indicia 126 may include a series of marks 180 disposed along a path 182 on a surface of the angular meter 124. For example, the marks 180 may include linear grooves or slots, linear protrusions, colored marks, or any combination thereof. The path 182 may be a linear path, a curved path following an angular movement of the arm portion 120 about the rotational joint 104, or another suitable arrangement. As illustrated, the marks 180 may be spaced apart from one another at a uniform spacing, which may facilitate measurements of the angular position in predetermined units. The angular meter 124 also may include a protruding measurement tip 184 (e.g., a triangular tip, a narrow tip, or pointer) on a distal end 186 of the arm portion 120. For example, the tip 184 may be a linear protrusion, which has a width of less than 10 or 20 percent of the arm portion 120 (e.g., a width of less than 1 or 2 mm). The tip 184 may facilitate more precise measurements along the marks 180. The angle meter 124 also may include the electronic meter unit 128 as discussed in further detail below.

Figure 5:
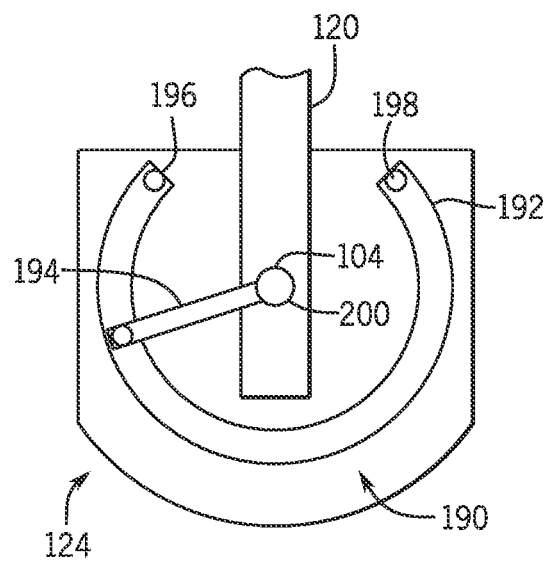
FIG. 5 is a schematic of an embodiment of a potentiometer of the angular measurement tool of FIGS. 1-4.

FIG. 5 is a schematic view of an embodiment of the angle meter 124 further illustrating a potentiometer 190 that may be used as part of the electronic meter unit 128. The potentiometer 190 may include an arcuate or curved conductive or resistive track 192 and a wiper 194 coupled to the rotational joint 104 and slidingly movable along the track 192. Opposite ends of the track 192 may include a positive voltage 196 and a zero voltage 198, such that movement of the wiper 194 along the track 192 changes an output voltage 200 provided to the electronic meter 128. In this manner, the potentiometer 190 may provide a variable voltage depending on the angular position of the arm portion 120 of the body portion 102 relative to the body portion 100. The voltage generated by the potentiometer 190 is configured to provide an angular measurement in addition to the visual measurement provided by the indicia 126.

Figure 6:
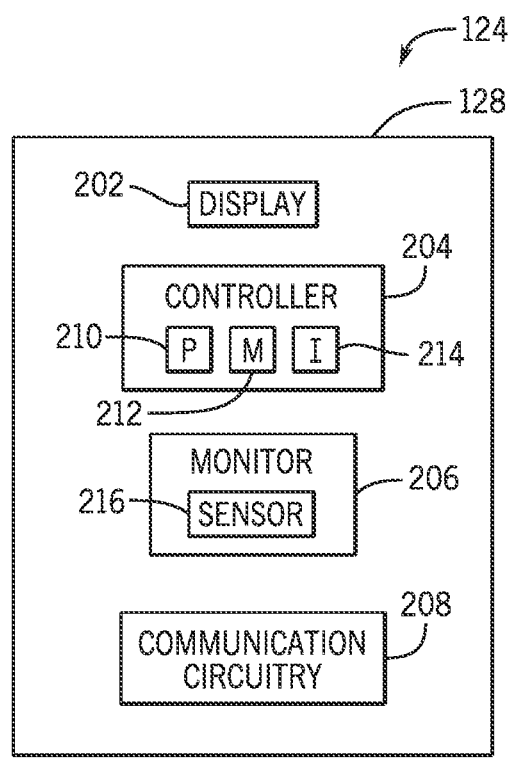
FIG. 6 is a schematic of an embodiment of an electronic meter unit of the angle meter of the angular measurement tool of FIGS. 1-5.

FIG. 6 is a diagram of an embodiment of the electronic meter unit 128 of the angle meter 124. In the illustrated embodiment, the electronic meter unit 128 includes a display 202, a controller 204, a monitoring system or monitor 206, and communications circuitry 208. The display 202 may include an electronic display, such as a liquid crystal display (LCD), configured to display the angular measurements obtained by the monitor 206. The controller 204 includes a processor 210, memory 212, and instructions 214 stored on the memory 212 and executable by the processor 216 to process sensor input and user input, determine an angular position, and output the angular position to the display 202. The monitor 206 includes one or more sensors 216, such as the potentiometer 190, a position sensor, an angular sensor, an optical sensor, or any combination thereof. The communication circuitry 208 may include wired and wireless communication circuitry, such that the electronic meter unit 128 may communicate angular measurement data to the control system 14 as discussed above with reference to FIG. 1.

Figure 7:
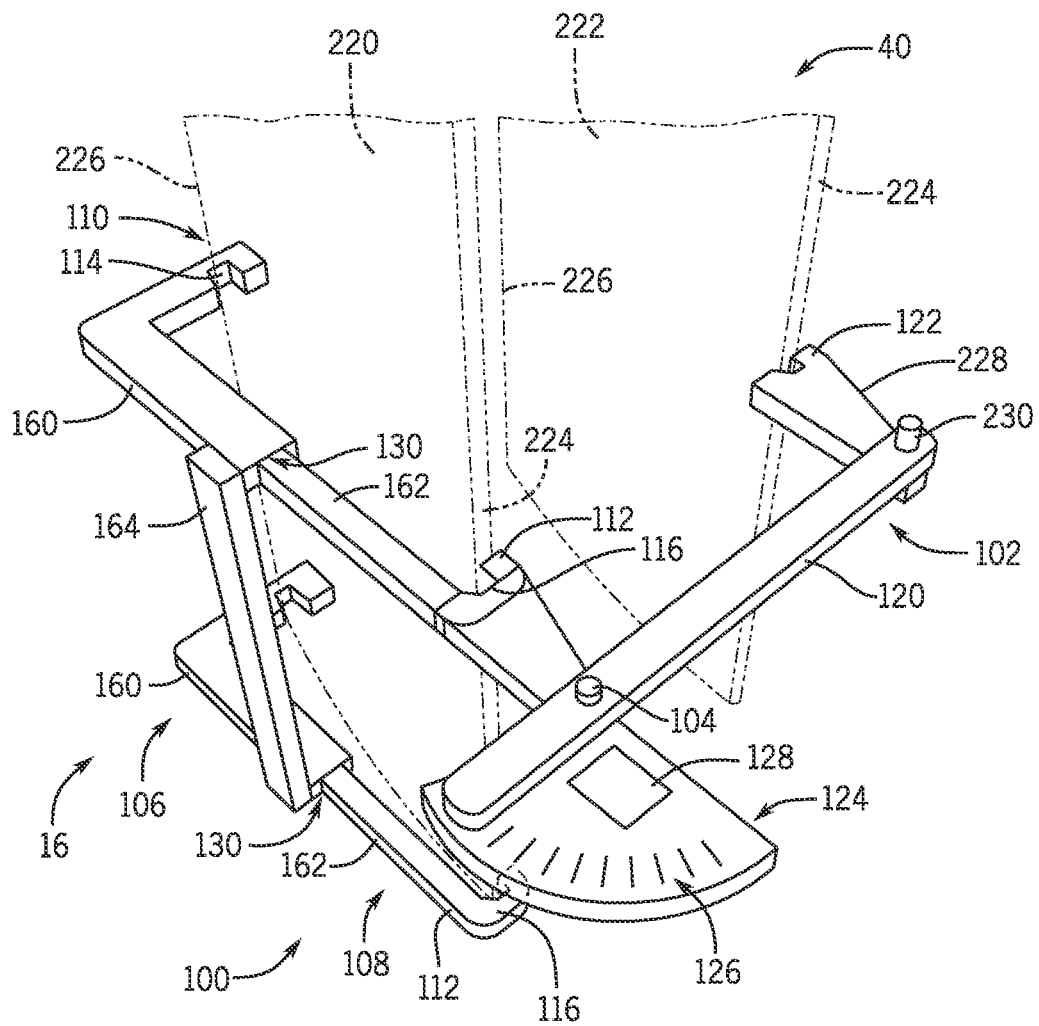
FIG. 7 is a perspective view of an embodiment of the angular measurement tool coupled to blades or vanes.

FIG. 7 is a perspective view of an embodiment of the angular measurement tool 16 coupled to a pair of blades or vanes 220 and 222. The blades or vanes 220 and 222 may include a pair of adjacent inlet guide vanes 40, a pair of adjacent compressor blades 46, a pair of adjacent turbine blades 68, a pair of adjacent compressor vanes 52, or a pair of adjacent turbine vanes 74. The angular measurement tool 16 has substantially similar or identical features as described above with reference to FIGS. 1-6. Accordingly, like features are illustrated with like element numbers as discussed in detail above.

The illustrated angular measurement tool 16 includes the body portion 100 having a pair of arms 160 in the arm portion 106 and a pair of arms 162 in the arm portion 108. The arms 160 are offset from one another by a distance, and the intermediate support 164 extends between and couples together the arms 160. Similarly, the arms 162 are offset from one another by a distance. The arms 160 and 162 are arranged in two adjacent pairs each having the telescopic or sliding axial connection 130, which includes the spring 138 to bias or draw the arm 162 inwardly into the arm 160. Accordingly, the spring biased arrangement of each pair of arms 160 and 162 biases and moves the hook portions 110 and 112 inwardly toward one another about the blade or vane 220, thereby biasing the recesses 114 and 116 to engage leading and trailing edges 224 and 226 of the blade or vane 220.

Additionally, the arm portion 120 is rotatably coupled to the arm portion 108 via the rotational joint 104, such that the arm portion 120 rotates toward the leading edge 224 of the blade or vane 222. In the illustrated embodiment, the arm portion 120 is rotatably coupled to an arm portion 228 of the body portion 102 via a rotational joint 230. The arm portion 228 includes the recess 122, which engages the leading edge 224 of the blade or vane 222. The rotational joints 104 and 230 may include the pin 148 and the resistance device 150 as described above with reference to FIG. 2. Accordingly, the resistance device 150 may facilitate control of the rotation of the arm portions 120 and 228, such that the rotational positions may be relatively stable (e.g., stationary unless a threshold force is applied) after rotation of the arm portions 120 and 228. For example, the rotational positions of the arm portion 120 and/or the arm portion 228 may remain fixed at the respective rotational joints 104 and 230 unless a user applies a force sufficient to overcome the resistance of the resistance device 150. In some embodiments, the resistance device 150 at the rotational joint 104 includes a torsion spring (and/or a coil spring extends between the arm portions 108 and 120 at an offset distance from the rotational joint 104), thereby applying torque about the rotational joint 104 to bias the recess 122 toward the leading edge 224 of the blade or vane 222. In this particular embodiment, after the recess 122 engages the leading edge 224 of the blade or vane 222, the user may apply an opposite force to overcome the spring force of the spring to separate and/or reposition the angular measurement tool 16 relative to the blade or vane 222.

In some embodiments, the resistance device 150 of the rotational joints 104 and 230 may include a locking mechanism or angular lock, which may be engaged to lock the rotational positions of the arm portions 120 and 228 after the recess 122 engages the leading edge 224 of the blade or vane 222. The angular lock may include a spring-loaded locking pin that fits into one of a plurality of locking recesses, a threaded fastener (e.g., thumb screw) that extends between the arm portions 120 and 228, an adjustable friction device configured to increase friction between the arm portions 120 and 228 and/or increase friction at the rotational joint 230, or any combination thereof. The resistance device 150 may include any combination of the features described herein, such as the angular lock, the spring, one or more coaxial sleeves that resist rotation via friction, a clicking mechanism configured to click from one rotational position to another similar to a socket wrench, or any combination thereof.

Upon engagement of the recesses 114, 116, and 122 with the corresponding leading and trailing edges 224 and 226 of the blades or vanes 220 and 222, the angular position of the blades or vanes 220 and 222 may be determined via the angle meter 124. As illustrated, the relative position of the arm portion 120 along the indicia 126 may be used to visually determine the angular position of the blades or vanes 220 and 222. Additionally, the electronic meter unit 128 may be used to determine the angular position of the blades or vanes 220 and 222 based on sensor feedback regarding the angular position of the arm portion 120 relative to the body portion 100. As a result of the resistance device 150, the spring-biased contacts, and/or the angular lock described above, a user may obtain accurate angular measurements of the blades or vanes 220 and 222 via the angular measurement tool 16 without any inaccuracies caused lack of proper contact between the angular measurement tool 16 and the blades or vanes 220 and 222. For example, in operation of the angular measurement tool 16, the recess 122 of the arm portion 228 of the body portion 102 may remain spring-biased in contact with the leading edge 224 of the blade or vane 222, and the recesses 114 and 116 of the arm portions 106 and 108 of the body portion 100 remain spring-biased in contact with the leading and trailing edges 224 and 226 of the blade or vane 220. As a result, proper contact is maintained between the angular measurement tool 16 and the blades or vanes 220 and 222 while obtaining the angular measurements, even if the user is unable to maintain a grip on the angular measurement tool 16. Thus, a user may be able to secure the angular measurement tool 16 to the blades or vanes 220 and 222 with only one hand (i.e., single-handed operation), and then obtain measurements without using any hands on the angular measurement tool 16.

FIG. 8 is a perspective view of an embodiment of the angular measurement tool 16 coupled to the blades or vanes 220 and 222 in a similar manner as discussed in detail above. The body portion 100 has substantially the same features as described above with reference to FIGS. 1-7. For example, the body portion 100 has the arm portions 106 and 108 with two pairs of arms 160 and 162. Each pair of the arms 160 and 162 is coupled together via the telescopic or sliding axial connection 130, which includes the spring 138 configured to pull each arm 162 inwardly into the arm 160 to bias the hook portions 110 and 112 toward one another to interface with the recesses 114 and 116 with the leading and trailing edges 224 and 226 of the blade or vane 220. The angular measurement tool 16 also includes the angle meter 124 coupled to the body portions 100 and 102. However, the body portion 102 differs from the embodiment of FIGS. 1-7.

As illustrated in FIG. 8, the body portion 102 includes an extension arm 240 extending from the angle meter 124 in a direction away from the arm portions 106 and 108 and away from the leading edge 224 of the blade or vane 220. The body portion 102 also includes an arm portion 242 rotatably coupled to the extension arm 240 via a rotational joint 244, and an arm portion 246 rotatably coupled to the arm portion 242 via a rotational joint 248. Similar to the rotational joint 104, each of the rotational joints 244 and 248 may include the pin 148 and the resistance device 150. The arm portion 246 extends across the angle meter 124, such that the arm portion 246 extends at variable angular positions along the indicia 126. The position of the arm portion 246 along the indicia 126 is used to identify an angular position of the blades or vanes 220 and 222. Additionally, the electronic meter unit 128 may be used to monitor the angular position of the arm portion 246 along the angle meter 124, and thus the angular position of the blades or vanes 220 and 222. In the illustrated embodiment, the arm portion 246 contacts a reference surface 250 on the blade or vane 222 and a reference surface 252 on the blade or vane 220. The illustrated reference surfaces 250 and 252 correspond to the leading edge 224 on each of the blades or vanes 220 and 222. The arm portion 246 of FIG. 8 is a straight rectangular bar that extends along the reference surfaces 250 and 252 in a direction perpendicular to the leading edges 224 of the blades or vanes 220 and 222. Again, each of the rotational joints 244 and 248 may include the resistance device 150 to help hold the position of the arm portions 242 and 246 after rotation about the rotational joints 244 and 248, such that proper contact is maintained between the angular measurement tool 16 and the blades or vanes 220 and 222.

FIG. 9 is a perspective view of the embodiment of the angular measurement tool 16 coupled to the blades or vanes 220 and 222. As illustrated, the angular measurement tool 16 of FIG. 9 is substantially the same as illustrated and described above with reference to FIGS. 1-8. However, in the illustrated embodiment, the arm portion 120 excludes the recess 122 configured to engage the leading edge 224 of the blade or vane 222. Instead, the arm portion 120 as illustrated in FIG. 9 is a straight rectangular bar, which has a flat surface facing towards the leading edges 224 of the blades or vanes 220 and 222. Additionally, the pair or arms 160 are offset from one another and coupled together by one intermediate support 164 similar to FIGS. 7 and 8, while the arms 162 are offset from one another and coupled together by one intermediate support 170 as illustrated in FIG. 3. The other aspects of the angular measurement tool 16 are as described in detail above with reference to FIGS. 1-8.

As illustrated in FIG. 9, the arm portion 120 is configured to contact at least the leading edge 224 as the reference surface 250 on the blade or vane 222, while the arm portion 120 also may contact the leading edge 224 as the reference surface 252 on the blade or vane 220. Upon contact between the arm portion 120 and the reference surfaces 250 and 252, the angular position of the blades or vanes 220 and 222 may be determined by the position of the arm portion 120 relative to the indicia 126 and/or a positional sensor of the electronic meter unit 128 as described in detail above.

Figure 10:
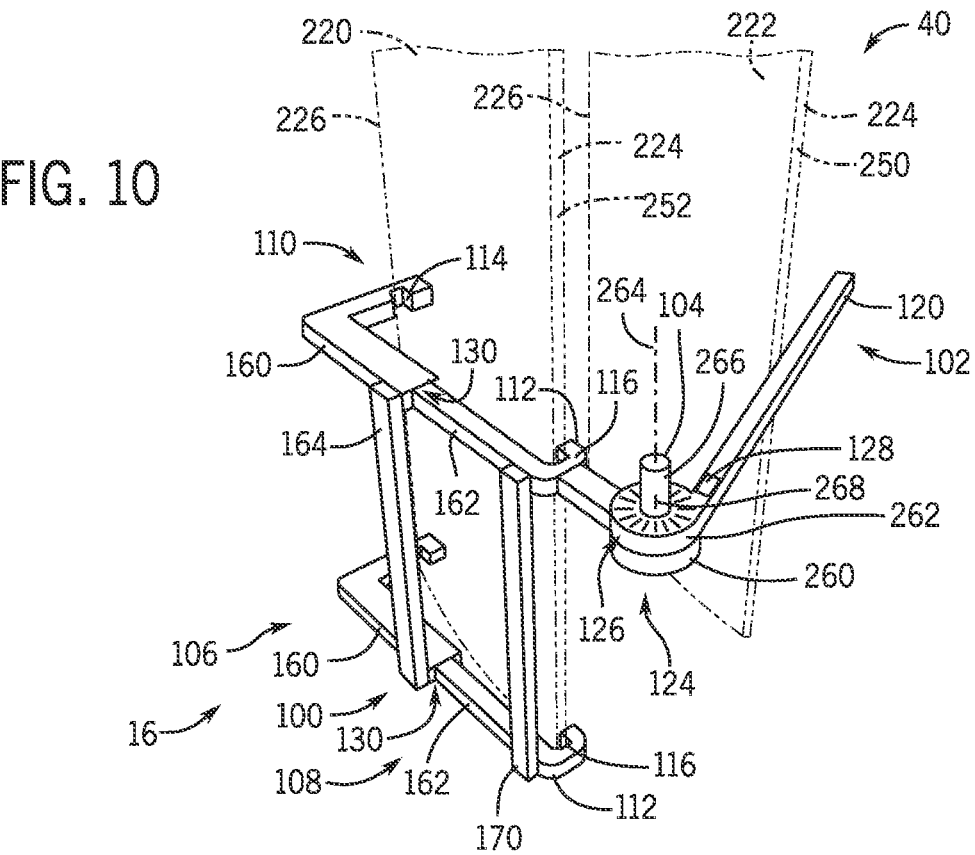
FIG. 10 is a perspective view of an embodiment of the angular measurement tool coupled to blades or vanes.

FIG. 10 is a perspective view of an embodiment of the angular measurement tool 16 coupled to the blades or vanes 220 and 222 for angular measurements. In the illustrated embodiment, the angular measurement tool 16 has substantially the same features as discussed above with reference to FIGS. 1-9. However, the body portion 102 of the angular measurement tool 16 differs from the previous embodiments in a few ways. For example, the arm portion 120 of the body portion 102 excludes the recess 122 and has a flat rectangular or straight rectangular structure, which is configured to contact the leading edge 224 defining the reference surface 250 of the blade or vane 222. Additionally, the arm portion 120 couples to the arm portion 108 of the body portion 100 via the rotational joint 104, wherein a connecting area of the rotational joint 104 has a disc-shaped portion 260 of the arm portion 108 overlapping and aligned with a disc-shaped portion 262 of the arm portion 120. The other aspects of the angular measurement tool 16 are substantially the same as described in detail above.

As illustrated in FIG. 10, the disc-shaped portions 260 and 262 are vertically stacked one over the other, wherein the rotational joint 104 extends along a central axis 264 through both of the disc-shaped portions 260 and 262. The angle meter 124 is partially disposed on the disc-shaped portion 262 of the arm portion 120. For example, the indicia 126 are disposed in a circular arrangement about the disc-shaped portion 262 around the rotational joint 104. The rotational joint 104 has a protruding portion 266 extending vertically or perpendicularly above the disc-shaped portion 262, and the protruding portion 266 includes a mark 268 (e.g., pointer) on a sidewall of the protruding portion 266. The mark 268 provides an indication of the angular position relative to the indicia 126. For example, the protruding portion 266 having the mark 268 may be in a fixed position relative to the disc-shaped portion 260, while the disc-shaped portion 262 having the indicia 126 rotates along with the arm portion 120 while positioning the arm portion 120 against the reference surface 250 of the blade or vane 222. Accordingly, the position of the mark 268 relative to the indicia 126 provides a visual indication of the angular position of both the arm portion 120 and the blades or vanes 220 and 222. The angle meter 124 also may include the electronic meter unit 128 that uses a positional sensor, such as the potentiometer 190, to measure and display an angular position of the arm portion 120 and thus the blades or vanes 220 and 222.

Figure 11:
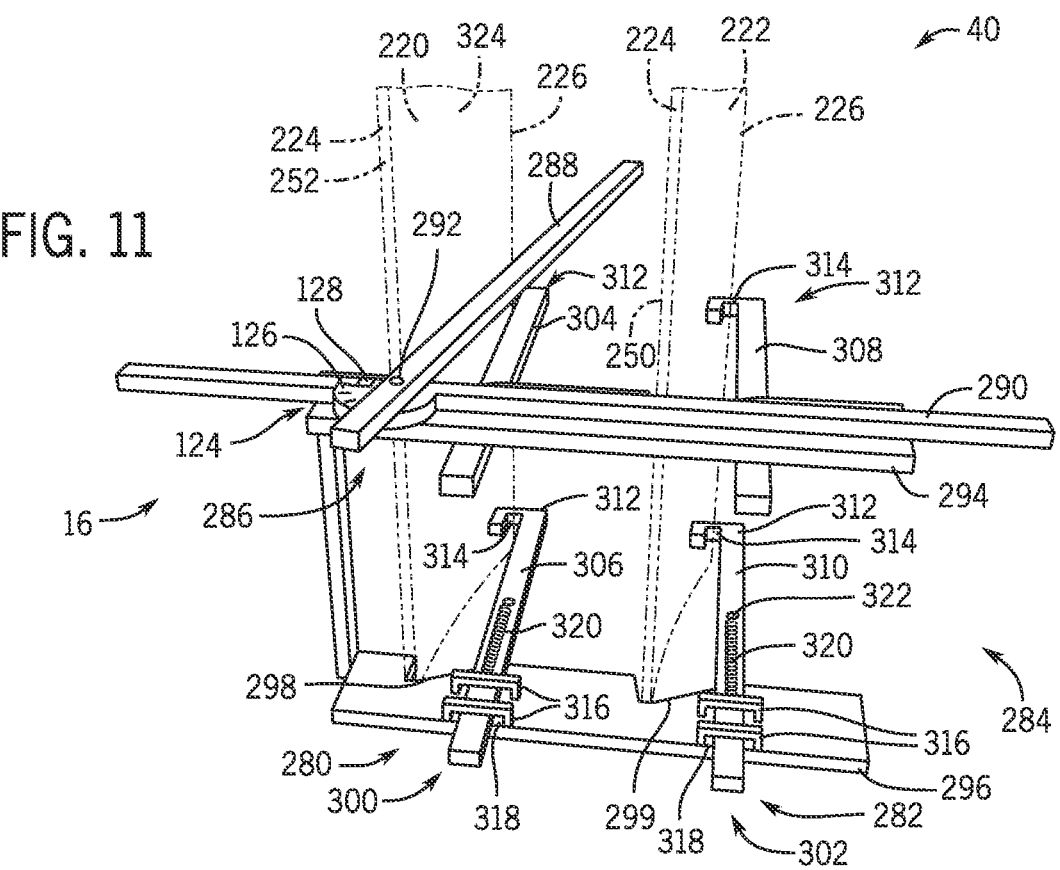
FIG. 11 is a perspective view of an embodiment of the angular measurement tool coupled to blades or vanes.

FIG. 11 is a perspective view of an embodiment of the angular measurement tool 16 coupled to the blades or vanes 220 and 222 for angular measurements. The embodiment of FIG. 11 has some similar features as the embodiments of FIGS. 1-10. However, the angular measurement tool 16 of FIG. 11 has compression retention assemblies 280 and 282 (e.g., spring-loaded arm assemblies) for both of the blades or vanes 220 and 222. In the illustrated embodiment, the angular measurement tool 16 includes a body portion 284 having the compression retention assemblies 280 and 282, and a body portion 286 having the angle meter 124 and arm portions 288 and 290 rotatably coupled together at a rotational joint 292 at the angle meter 124.

The body portion 284 has cross-plates 294 and 296 (e.g., parallel plates) extending across the leading edges 224 (i.e., the reference surfaces 250 and 252) of the blades or vanes 220 and 222. Each of the cross-plates 294 and 296 includes an angled recess 298 to receive the leading edge 224 of the blade or vane 220 and an angled recess 299 to receive the leading edge 224 of the blade or vane 222. The body portion 284 also includes an arm portion 300 of the compression retention assembly 280, and an arm portion 302 of the compression retention assembly 282. The arm portion 300 includes arms 304 306 coupled to the respective cross-plates 294 and 296, while the arm portion 302 includes arms 308 and 310 coupled to the respective cross-plates 294 and 296. Each of the arms 304, 306, 308, and 310 includes a hook portion 312 having a recess 314. The recesses 314 of the hook portions 312 are configured to engage and receive the trailing edges 226 of the blades or vanes 220 and 222. For example, the recesses 314 of the hook portions 312 of the arms 304 and 306 engage the trailing edge 226 of the blade or vane 220, while the recesses 314 of the hook portions 312 of the arms 308 and 310 engage the trailing edge 226 of the blade or vane 222. Each of the arms 304, 306, 308, and 310 is further coupled to the cross-plates 294 and 296 via one or more U-shaped clamps 316, which allow axial movement of the arms through a receptacle 318 in the U-shaped clamps 316. The arms 304, 306, 308, and 310 are spring loaded via a spring 320 coupled to one of the clamps 316 and a fastener 322 on the respective arm. Accordingly, the compression retention assembly 280 includes the arms 304 and 306 spring loaded relative to the cross-plates 294 and 296 to compressingly fit around the blade or vane 220, while the compression retention assembly 282 has the arms 308 and 310 spring loaded relative to the cross-plates 294 and 296 to compressingly fit around the blade or vane 222.

Once the compression retention assemblies 280 and 282 secure the angular measurement tool 16 to the leading and trailing edges 224 and 226 of the blades or vanes 220 and 222, the arm portions 288 and 290 may be used along the angle meter 124 to determine an angular position of the blades or vanes 220 and 222. For example, the arm portion 288 is rotated about the rotational joint 292 to align with a surface of the blade or vane 220, while the arm portion 290 may contact the leading edges 224 (i.e., the reference surfaces 250 and 252) of the blades or vanes 220 and 222. The angular position of the arm portion 288 and thus the blades or vanes 220 and 222 is determined via the position of the arm portion 288 along the visual indicia 126 of the angle meter 124 and/or the positional feedback from sensors of the electronic meter unit 128.

Technical effects of the disclosed embodiments include angular measurement tools configured to measure an angular position of blades or vanes (e.g., inlet guide vanes) in machinery, such as a compressor of a gas turbine engine. However, the angular measurement tools may be used to measure an angular position of other components in a variety of machinery and applications. The angular measurement tools include spring-loaded arms to hold the tool in place on the blades or vanes. The angular measurement tool also includes an angle meter that measures an angular position of the blades or vanes via an angular position of an arm, which may be spring-loaded (or biased) toward a reference surface (e.g., leading edge) of the blade or vane. The angular measurement tools ensure proper contact between the arms and the blades or vanes, even if a user cannot maintain a grip on the angular measurement tool. The angle meter measures the angular position via visual indicia, positional sensors, or any combination thereof.

The subject matter described in detail above may be defined by one or more clauses, as set forth below.

A tool including a first body portion having opposite first and second recesses facing toward one another about a space, wherein the opposite first and second recesses are configured to contact opposite sides of a first component disposed in the space. The tool includes a second body portion configured to rotate relative to the first body portion, wherein the second body portion is configured to contact a reference surface relative to the first component. The tool includes an angle meter configured to measure an angle of the first component based on an angular position of the second body portion relative to the first body portion.

The tool of the preceding clause, wherein the first component includes a first blade or a first vane, and the opposite sides include a first leading edge and a first trailing edge of the first blade or the first vane.

The tool of any preceding clause, wherein the reference surface is disposed on a second component offset from the first component, and the second component includes a second blade or a second vane.

The tool of any preceding clause, wherein the reference surface includes a second leading edge or a second trailing edge of the second blade or the second vane.

The tool of any preceding clause, wherein the first component includes an inlet guide vane (IGV) of a compressor of a gas turbine engine.

The tool of any preceding clause, wherein the first body portion includes a first hook portion having the first recess and a second hook portion having the second recess.

The tool of any preceding clause, wherein the first body portion includes first and second arm portions configured to move relative to one another to adjust a distance between the first and second recesses.

The tool of any preceding clause, wherein the first and second arm portions are configured to move axially relative to one another.

The tool of any preceding clause, wherein the first arm portion includes a plurality of first arms offset from one another, and the second arm portion includes a plurality of second arms offset from one another.

The tool of any preceding clause, including a first intermediate support extending crosswise to and connecting the plurality of first arms, or a second intermediate support extending crosswise to and connecting the plurality of second arms, or a combination thereof.

The tool of any preceding clause, wherein the first recess is disposed in each of the plurality of first arms, or the second recess is disposed in each of the plurality of second arms, or a combination thereof.

The tool of any preceding clause, wherein the first and second arm portions are spring-biased toward one another to drive the first and second recesses toward one another about the space.

The tool of any preceding clause, wherein the second body portion includes first and second arm portions configured to move relative to one another to facilitate the contact with the reference surface.

The tool of any preceding clause, wherein the first arm portion is coupled to the first body portion via a first rotatable joint, and the second arm portion is coupled to the first arm portion via a second rotatable joint.

The tool of any preceding clause, wherein the second arm portion includes a third recess configured to contact the reference surface, and the reference surface is disposed on a second component offset from the first component.

The tool of any preceding clause, wherein the second arm portion intersects with the angle meter, the reference surface includes a first reference surface on the first component and a second reference surface on a second component offset from the first component, and the second arm portion is configured to contact the first and second reference surfaces.

The tool of any preceding clause, wherein the meter portion includes a series of angular indicia, a positional sensor, a display, a communications circuit, or a combination thereof.

A tool including a first body portion having opposite first and second recesses facing toward one another about a space, wherein the first body portion comprises first and second arm portions configured to move relative to one another to adjust a distance between the first and second recesses. The tool includes a second body portion configured to rotate relative to the first body portion. The tool includes an angle meter configured to measure an angle based on an angular position of the second body portion relative to the first body portion.

The tool of the preceding clause, wherein the first and second arm portions are spring-biased toward one another to drive the first and second recesses toward one another to reduce the distance.

A method including positioning a first body portion having opposite first and second recesses facing toward one another about a space, such that the opposite first and second recesses contact opposite sides of a first component disposed in the space. The method includes rotating a second body portion relative to the first body portion to contact a reference surface relative to the first component. The method includes measuring, via an angle meter, an angle of the first component based on an angular position of the second body portion relative to the first body portion.

This written description uses examples to describe the present embodiments, including the best mode, and also to enable any person skilled in the art to practice the presently disclosed embodiments, including making and using any devices or systems and performing any incorporated methods. The patentable scope of the presently disclosed embodiments is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A tool, comprising:
   a first body portion having opposite first and second recesses facing toward one another about a space, wherein the opposite first and second recesses are configured to contact opposite sides of a first component disposed in the space;
   a second body portion configured to rotate relative to the first body portion, wherein the second body portion is configured to contact a reference surface relative to the first component; and
   an angle meter configured to measure an angle of the first component based on an angular position of the second body portion relative to the first body portion, wherein the tool comprises at least one of:
   the first component comprises a first blade or a first vane, and the opposite sides comprise a first leading edge and a first trailing edge of the first blade or the first vane, or
   the first component comprises an inlet guide vane (IGV) of a compressor of a gas turbine engine.

2. The tool of claim 1, wherein the first component comprises the first blade or the first vane, and the opposite sides comprise the first leading edge and the first trailing edge of the first blade or the first vane.

3. The tool of claim 2, wherein the reference surface is disposed on a second component offset from the first component, and the second component comprises a second blade or a second vane.

4. The tool of claim 3, wherein the reference surface comprises a second leading edge or a second trailing edge of the second blade or the second vane.

5. The tool of claim 1, wherein the first component comprises the inlet guide vane (IGV) of the compressor of the gas turbine engine.

6. The tool of claim 1, wherein the first body portion comprises a first hook portion having the first recess and a second hook portion having the second recess.

7. The tool of claim 1, wherein the first body portion comprises first and second arm portions configured to move relative to one another to adjust a distance between the first and second recesses.

8. The tool of claim 7, wherein the first and second arm portions are configured to move axially relative to one another.

9. The tool of claim 7, wherein the first arm portion comprises a plurality of first arms offset from one another, and the second arm portion comprises a plurality of second arms offset from one another.

10. The tool of claim 9, comprising a first intermediate support extending crosswise to and connecting the plurality of first arms, or a second intermediate support extending crosswise to and connecting the plurality of second arms, or a combination thereof.

11. The tool of claim 9, wherein the first recess is disposed in each of the plurality of first arms, or the second recess is disposed in each of the plurality of second arms, or a combination thereof.

12. The tool of claim 7, wherein the first and second arm portions are spring-biased toward one another to drive the first and second recesses toward one another about the space.

13. The tool of claim 1, wherein the second body portion comprises first and second arm portions configured to move relative to one another to facilitate the contact with the reference surface.

14. The tool of claim 13, wherein the first arm portion is coupled to the first body portion via a first rotatable joint, and the second arm portion is coupled to the first arm portion via a second rotatable joint.

15. The tool of claim 14, wherein the second arm portion comprises a third recess configured to contact the reference surface, and the reference surface is disposed on a second component offset from the first component.

16. The tool of claim 14, wherein the second arm portion intersects with the angle meter, the reference surface includes a first reference surface on the first component and a second reference surface on a second component offset from the first component, and the second arm portion is configured to contact the first and second reference surfaces.

17. The tool of claim 1, wherein the meter portion comprises a series of angular indicia, a positional sensor, a display, a communications circuit, or a combination thereof.

18. A tool, comprising:
   a first body portion having opposite first and second recesses facing toward one another about a space, wherein the first body portion comprises first and second arm portions configured to move relative to one another to adjust a distance between the first and second recesses, wherein the first and second arm portions are spring-biased toward one another to drive the first and second recesses toward one another to reduce the distance;

a second body portion configured to rotate relative to the first body portion; and an angle meter configured to measure an angle based on an angular position of the second body portion relative to the first body portion.

19. A method, comprising:

positioning a first body portion of a tool having opposite first and second recesses facing toward one another about a space, such that the opposite first and second recesses contact opposite sides of a first component disposed in the space;

rotating a second body portion of the tool relative to the first body portion to contact a reference surface relative to the first component; and measuring, via an angle meter of the tool, an angle of the first component based on an angular position of the second body portion relative to the first body portion, wherein the tool comprises at least one of:

the first component comprises a first blade or a first vane, and the opposite sides comprise a first leading edge and a first trailing edge of the first blade or the first vane, or the first component comprises an inlet guide vane (IGV) of a compressor of a gas turbine engine.

20. A tool, comprising:

a first body portion having opposite first and second recesses facing toward one another about a space, wherein the opposite first and second recesses are configured to contact opposite sides of a first component disposed in the space, the first body portion comprises first and second arm portions configured to move relative to one another to adjust a distance between the first and second recesses, the first arm portion comprises a plurality of first arms offset from one another, and the second arm portion comprises a plurality of second arms offset from one another;

a second body portion configured to rotate relative to the first body portion, wherein the second body portion is configured to contact a reference surface relative to the first component; and an angle meter configured to measure an angle of the first component based on an angular position of the second body portion relative to the first body portion.

21. The tool of claim 20, wherein the first and second arm portions are spring-biased toward one another to drive the first and second recesses toward one another about the space.

22. The tool of claim 20, wherein the first component comprises a first blade or a first vane of a compressor or a turbine, the reference surface is disposed on a second component offset from the first component, and the second component comprises a second blade or a second vane of the compressor or the turbine.

23. A tool, comprising:

a first body portion having opposite first and second recesses facing toward one another about a space, wherein the opposite first and second recesses are configured to contact opposite sides of a first component disposed in the space;

a second body portion configured to rotate relative to the first body portion, wherein the second body portion is configured to contact a reference surface relative to the first component, the second body portion comprises first and second arm portions configured to move relative to one another to facilitate the contact with the reference surface, the first arm portion is coupled to the first body portion via a first rotatable joint, and the second arm portion is coupled to the first arm portion via a second rotatable joint; and an angle meter configured to measure an angle of the first component based on an angular position of the second body portion relative to the first body portion.

24. The tool of claim 23, wherein the first component comprises a first blade or a first vane of a compressor or a turbine, the reference surface is disposed on a second component offset from the first component, and the second component comprises a second blade or a second vane of the compressor or the turbine.

* * * * *